(12) United States Patent
Tang et al.

(10) Patent No.: US 9,368,131 B1
(45) Date of Patent: Jun. 14, 2016

(54) DATA STORAGE DEVICE EMPLOYING MIRRORED CROSS-TRACK PROFILES FOR TOP AND BOTTOM DISK SURFACES

(71) Applicant: Western Digital (Fremont), LLC, Fremont, CA (US)

(72) Inventors: Kathy X. Tang, San Jose, CA (US); Xiao Z. Wu, San Jose, CA (US); Hong Pan, Fremont, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 0 days.

(21) Appl. No.: 14/678,816

(22) Filed: Apr. 3, 2015

(51) Int. Cl.
*G11B 21/02* (2006.01)
*G11B 5/027* (2006.01)
*G11B 5/012* (2006.01)
*G11B 5/596* (2006.01)

(52) U.S. Cl.
CPC ............ *G11B 5/012* (2013.01); *G11B 5/59627* (2013.01)

(58) Field of Classification Search
None
See application file for complete search history.

(56) References Cited

U.S. PATENT DOCUMENTS

| | | | |
|---|---|---|---|
| 4,414,589 A * | 11/1983 | Oliver | G11B 5/012 360/135 |
| 4,970,616 A | 11/1990 | Ramaswamy | |
| 5,193,036 A * | 3/1993 | Green | G11B 19/02 360/77.05 |
| 5,506,735 A * | 4/1996 | Okazaki | G11B 5/59655 360/75 |
| 5,768,073 A | 6/1998 | Nepela et al. | |
| 6,018,789 A | 1/2000 | Sokolov et al. | |
| 6,065,095 A | 5/2000 | Sokolov et al. | |
| 6,078,452 A | 6/2000 | Kittilson et al. | |
| 6,081,447 A | 6/2000 | Lofgren et al. | |
| 6,092,149 A | 7/2000 | Hicken et al. | |
| 6,092,150 A | 7/2000 | Sokolov et al. | |
| 6,094,707 A | 7/2000 | Sokolov et al. | |
| 6,105,104 A | 8/2000 | Guttmann et al. | |
| 6,111,717 A | 8/2000 | Cloke et al. | |
| 6,145,052 A | 11/2000 | Howe et al. | |
| 6,175,893 B1 | 1/2001 | D'Souza et al. | |
| 6,178,056 B1 | 1/2001 | Cloke et al. | |
| 6,191,909 B1 | 2/2001 | Cloke et al. | |
| 6,195,218 B1 | 2/2001 | Guttmann et al. | |
| 6,205,494 B1 | 3/2001 | Williams | |
| 6,208,477 B1 | 3/2001 | Cloke et al. | |
| 6,223,303 B1 | 4/2001 | Billings et al. | |
| 6,230,233 B1 | 5/2001 | Lofgren et al. | |
| 6,246,346 B1 | 6/2001 | Cloke et al. | |
| 6,249,393 B1 | 6/2001 | Billings et al. | |
| 6,256,695 B1 | 7/2001 | Williams | |
| 6,262,857 B1 | 7/2001 | Hull et al. | |
| 6,263,459 B1 | 7/2001 | Schibilla | |
| 6,272,694 B1 | 8/2001 | Weaver et al. | |
| 6,278,568 B1 | 8/2001 | Cloke et al. | |
| 6,279,089 B1 | 8/2001 | Schibilla et al. | |
| 6,289,484 B1 | 9/2001 | Rothberg et al. | |
| 6,292,912 B1 | 9/2001 | Cloke et al. | |
| 6,310,740 B1 | 10/2001 | Dunbar et al. | |
| 6,317,850 B1 | 11/2001 | Rothberg | |
| 6,327,106 B1 | 12/2001 | Rothberg | |
| 6,337,778 B1 | 1/2002 | Gagne | |

(Continued)

*Primary Examiner* — K. Wong (57) ABSTRACT

A data storage device is disclosed wherein when a first head is over a top disk surface, a first undershoot of a first cross-track profile is closer to an inner diameter of a disk and a second undershoot of the first cross-track profile is closer to an outer diameter of the disk. When a second head is over a bottom disk surface, a second undershoot of a second cross-track profile is closer to the inner diameter of the disk and a first undershoot of the second cross-track profile is closer to the outer diameter of the disk.

8 Claims, 4 Drawing Sheets

(56) References Cited

U.S. PATENT DOCUMENTS

| | | |
|---|---|---|
| 6,369,969 B1 | 4/2002 | Christiansen et al. |
| 6,384,999 B1 | 5/2002 | Schibilla |
| 6,388,833 B1 | 5/2002 | Golowka et al. |
| 6,405,342 B1 | 6/2002 | Lee |
| 6,408,357 B1 | 6/2002 | Hanmann et al. |
| 6,408,406 B1 | 6/2002 | Parris |
| 6,411,452 B1 | 6/2002 | Cloke |
| 6,411,458 B1 | 6/2002 | Billings et al. |
| 6,412,083 B1 | 6/2002 | Rothberg et al. |
| 6,415,349 B1 | 7/2002 | Hull et al. |
| 6,425,128 B1 | 7/2002 | Krapf et al. |
| 6,441,981 B1 | 8/2002 | Cloke et al. |
| 6,442,328 B1 | 8/2002 | Elliott et al. |
| 6,445,524 B1 | 9/2002 | Nazarian et al. |
| 6,449,767 B1 | 9/2002 | Krapf et al. |
| 6,453,115 B1 | 9/2002 | Boyle |
| 6,470,420 B1 | 10/2002 | Hospodor |
| 6,480,020 B1 | 11/2002 | Jung et al. |
| 6,480,349 B1 | 11/2002 | Kim et al. |
| 6,480,932 B1 | 11/2002 | Vallis et al. |
| 6,483,986 B1 | 11/2002 | Krapf |
| 6,487,032 B1 | 11/2002 | Cloke et al. |
| 6,490,635 B1 | 12/2002 | Holmes |
| 6,493,173 B1 | 12/2002 | Kim et al. |
| 6,499,083 B1 | 12/2002 | Hamlin |
| 6,519,104 B1 | 2/2003 | Cloke et al. |
| 6,525,892 B1 | 2/2003 | Dunbar et al. |
| 6,545,830 B1 | 4/2003 | Briggs et al. |
| 6,546,489 B1 | 4/2003 | Frank, Jr. et al. |
| 6,550,021 B1 | 4/2003 | Dalphy et al. |
| 6,552,880 B1 | 4/2003 | Dunbar et al. |
| 6,553,457 B1 | 4/2003 | Wilkins et al. |
| 6,578,106 B1 | 6/2003 | Price |
| 6,580,573 B1 | 6/2003 | Hull et al. |
| 6,594,183 B1 | 7/2003 | Lofgren et al. |
| 6,600,620 B1 | 7/2003 | Krounbi et al. |
| 6,601,137 B1 | 7/2003 | Castro et al. |
| 6,603,622 B1 | 8/2003 | Christiansen et al. |
| 6,603,625 B1 | 8/2003 | Hospodor et al. |
| 6,604,220 B1 | 8/2003 | Lee |
| 6,606,682 B1 | 8/2003 | Dang et al. |
| 6,606,714 B1 | 8/2003 | Thelin |
| 6,606,717 B1 | 8/2003 | Yu et al. |
| 6,611,393 B1 | 8/2003 | Nguyen et al. |
| 6,615,312 B1 | 9/2003 | Hamlin et al. |
| 6,639,748 B1 | 10/2003 | Christiansen et al. |
| 6,647,481 B1 | 11/2003 | Luu et al. |
| 6,654,193 B1 | 11/2003 | Thelin |
| 6,657,810 B1 | 12/2003 | Kupferman |
| 6,661,591 B1 | 12/2003 | Rothberg |
| 6,665,772 B1 | 12/2003 | Hamlin |
| 6,674,606 B1 * | 1/2004 | Baumann ........... G11B 5/59605 360/78.06 |
| 6,687,073 B1 | 2/2004 | Kupferman |
| 6,687,078 B1 | 2/2004 | Kim |
| 6,687,850 B1 | 2/2004 | Rothberg |
| 6,690,523 B1 | 2/2004 | Nguyen et al. |
| 6,690,882 B1 | 2/2004 | Hanmann et al. |
| 6,691,198 B1 | 2/2004 | Hamlin |
| 6,691,213 B1 | 2/2004 | Luu et al. |
| 6,691,255 B1 | 2/2004 | Rothberg et al. |
| 6,693,760 B1 | 2/2004 | Krounbi et al. |
| 6,694,477 B1 | 2/2004 | Lee |
| 6,697,914 B1 | 2/2004 | Hospodor et al. |
| 6,704,153 B1 | 3/2004 | Rothberg et al. |
| 6,708,251 B1 | 3/2004 | Boyle et al. |
| 6,710,951 B1 | 3/2004 | Cloke |
| 6,711,628 B1 | 3/2004 | Thelin |
| 6,711,635 B1 | 3/2004 | Wang |
| 6,711,660 B1 | 3/2004 | Milne et al. |
| 6,715,044 B2 | 3/2004 | Lofgren et al. |
| 6,724,982 B1 | 4/2004 | Hamlin |
| 6,725,329 B1 | 4/2004 | Ng et al. |
| 6,735,650 B1 | 5/2004 | Rothberg |
| 6,735,693 B1 | 5/2004 | Hamlin |
| 6,744,772 B1 | 6/2004 | Eneboe et al. |
| 6,745,283 B1 | 6/2004 | Dang |
| 6,751,402 B1 | 6/2004 | Elliott et al. |
| 6,757,481 B1 | 6/2004 | Nazarian et al. |
| 6,772,281 B2 | 8/2004 | Hamlin |
| 6,781,826 B1 | 8/2004 | Goldstone et al. |
| 6,782,449 B1 | 8/2004 | Codilian et al. |
| 6,791,779 B1 | 9/2004 | Singh et al. |
| 6,792,486 B1 | 9/2004 | Hanan et al. |
| 6,799,274 B1 | 9/2004 | Hamlin |
| 6,811,427 B2 | 11/2004 | Garrett et al. |
| 6,826,003 B1 | 11/2004 | Subrahmanyam |
| 6,826,614 B1 | 11/2004 | Hanmann et al. |
| 6,832,041 B1 | 12/2004 | Boyle |
| 6,832,929 B2 | 12/2004 | Garrett et al. |
| 6,845,405 B1 | 1/2005 | Thelin |
| 6,845,427 B1 | 1/2005 | Atai-Azimi |
| 6,850,443 B2 | 2/2005 | Lofgren et al. |
| 6,851,055 B1 | 2/2005 | Boyle et al. |
| 6,851,063 B1 | 2/2005 | Boyle et al. |
| 6,853,731 B1 | 2/2005 | Boyle et al. |
| 6,854,022 B1 | 2/2005 | Thelin |
| 6,862,660 B1 | 3/2005 | Wilkins et al. |
| 6,880,043 B1 | 4/2005 | Castro et al. |
| 6,882,486 B1 | 4/2005 | Kupferman |
| 6,884,085 B1 | 4/2005 | Goldstone |
| 6,888,831 B1 | 5/2005 | Hospodor et al. |
| 6,892,217 B1 | 5/2005 | Hanmann et al. |
| 6,892,249 B1 | 5/2005 | Codilian et al. |
| 6,892,313 B1 | 5/2005 | Codilian et al. |
| 6,895,455 B1 | 5/2005 | Rothberg |
| 6,895,500 B1 | 5/2005 | Rothberg |
| 6,898,730 B1 | 5/2005 | Hanan |
| 6,910,099 B1 | 6/2005 | Wang et al. |
| 6,928,470 B1 | 8/2005 | Hamlin |
| 6,931,439 B1 | 8/2005 | Hanmann et al. |
| 6,934,104 B1 | 8/2005 | Kupferman |
| 6,934,713 B2 | 8/2005 | Schwartz et al. |
| 6,940,873 B2 | 9/2005 | Boyle et al. |
| 6,943,978 B1 | 9/2005 | Lee |
| 6,948,165 B1 | 9/2005 | Luu et al. |
| 6,950,267 B1 | 9/2005 | Liu et al. |
| 6,954,733 B1 | 10/2005 | Ellis et al. |
| 6,961,814 B1 | 11/2005 | Thelin et al. |
| 6,965,489 B1 | 11/2005 | Lee et al. |
| 6,965,563 B1 | 11/2005 | Hospodor et al. |
| 6,965,966 B1 | 11/2005 | Rothberg et al. |
| 6,967,799 B1 | 11/2005 | Lee |
| 6,968,422 B1 | 11/2005 | Codilian et al. |
| 6,968,450 B1 | 11/2005 | Rothberg et al. |
| 6,973,495 B1 | 12/2005 | Milne et al. |
| 6,973,570 B1 | 12/2005 | Hamlin |
| 6,976,190 B1 | 12/2005 | Goldstone |
| 6,983,316 B1 | 1/2006 | Milne et al. |
| 6,986,007 B1 | 1/2006 | Procyk et al. |
| 6,986,154 B1 | 1/2006 | Price et al. |
| 6,995,933 B1 | 2/2006 | Codilian et al. |
| 6,996,501 B1 | 2/2006 | Rothberg |
| 6,996,669 B1 | 2/2006 | Dang et al. |
| 7,002,926 B1 | 2/2006 | Eneboe et al. |
| 7,003,674 B1 | 2/2006 | Hamlin |
| 7,006,316 B1 | 2/2006 | Sargenti, Jr. et al. |
| 7,009,820 B1 | 3/2006 | Hogg |
| 7,023,639 B1 | 4/2006 | Kupferman |
| 7,024,491 B1 | 4/2006 | Hanmann et al. |
| 7,024,549 B1 | 4/2006 | Luu et al. |
| 7,024,614 B1 | 4/2006 | Thelin et al. |
| 7,027,716 B1 | 4/2006 | Boyle et al. |
| 7,028,174 B1 | 4/2006 | Atai-Azimi et al. |
| 7,031,902 B1 | 4/2006 | Catiller |
| 7,046,465 B1 | 5/2006 | Kupferman |
| 7,046,488 B1 | 5/2006 | Hogg |
| 7,050,252 B1 | 5/2006 | Vallis |
| 7,054,937 B1 | 5/2006 | Milne et al. |
| 7,055,000 B1 | 5/2006 | Severtson |
| 7,055,167 B1 | 5/2006 | Masters |
| 7,057,836 B1 | 6/2006 | Kupferman |
| 7,062,398 B1 | 6/2006 | Rothberg |
| 7,075,746 B1 | 7/2006 | Kupferman |

(56) References Cited

U.S. PATENT DOCUMENTS

| | | |
|---|---|---|
| 7,076,604 B1 | 7/2006 | Thelin |
| 7,082,494 B1 | 7/2006 | Thelin et al. |
| 7,088,538 B1 | 8/2006 | Codilian et al. |
| 7,088,545 B1 | 8/2006 | Singh et al. |
| 7,092,186 B1 | 8/2006 | Hogg |
| 7,095,577 B1 | 8/2006 | Codilian et al. |
| 7,099,095 B1 | 8/2006 | Subrahmanyam et al. |
| 7,106,537 B1 | 9/2006 | Bennett |
| 7,106,947 B2 | 9/2006 | Boyle et al. |
| 7,110,202 B1 | 9/2006 | Vasquez |
| 7,111,116 B1 | 9/2006 | Boyle et al. |
| 7,114,029 B1 | 9/2006 | Thelin |
| 7,120,737 B1 | 10/2006 | Thelin |
| 7,120,806 B1 | 10/2006 | Codilian et al. |
| 7,126,776 B1 | 10/2006 | Warren, Jr. et al. |
| 7,129,763 B1 | 10/2006 | Bennett et al. |
| 7,133,600 B1 | 11/2006 | Boyle |
| 7,136,244 B1 | 11/2006 | Rothberg |
| 7,146,094 B1 | 12/2006 | Boyle |
| 7,149,046 B1 | 12/2006 | Coker et al. |
| 7,150,036 B1 | 12/2006 | Milne et al. |
| 7,155,616 B1 | 12/2006 | Hamlin |
| 7,171,108 B1 | 1/2007 | Masters et al. |
| 7,171,110 B1 | 1/2007 | Wilshire |
| 7,194,576 B1 | 3/2007 | Boyle |
| 7,200,698 B1 | 4/2007 | Rothberg |
| 7,205,805 B1 | 4/2007 | Bennett |
| 7,206,497 B1 | 4/2007 | Boyle et al. |
| 7,215,496 B1 | 5/2007 | Kupferman et al. |
| 7,215,499 B1 * | 5/2007 | Li ................. G11B 5/5547 360/75 |
| 7,215,771 B1 | 5/2007 | Hamlin |
| 7,237,054 B1 | 6/2007 | Cain et al. |
| 7,240,161 B1 | 7/2007 | Boyle |
| 7,249,365 B1 | 7/2007 | Price et al. |
| 7,263,709 B1 | 8/2007 | Krapf |
| 7,274,639 B1 | 9/2007 | Codilian et al. |
| 7,274,659 B2 | 9/2007 | Hospodor |
| 7,275,116 B1 | 9/2007 | Hanmann et al. |
| 7,280,302 B1 | 10/2007 | Masiewicz |
| 7,292,774 B1 | 11/2007 | Masters et al. |
| 7,292,775 B1 | 11/2007 | Boyle et al. |
| 7,296,284 B1 | 11/2007 | Price et al. |
| 7,302,501 B1 | 11/2007 | Cain et al. |
| 7,302,579 B1 | 11/2007 | Cain et al. |
| 7,318,088 B1 | 1/2008 | Mann |
| 7,319,806 B1 | 1/2008 | Willner et al. |
| 7,325,244 B2 | 1/2008 | Boyle et al. |
| 7,330,323 B1 | 2/2008 | Singh et al. |
| 7,346,790 B1 | 3/2008 | Klein |
| 7,366,641 B1 | 4/2008 | Masiewicz et al. |
| 7,369,340 B1 | 5/2008 | Dang et al. |
| 7,369,343 B1 | 5/2008 | Yeo et al. |
| 7,372,650 B1 | 5/2008 | Kupferman |
| 7,380,147 B1 | 5/2008 | Sun |
| 7,392,340 B1 | 6/2008 | Dang et al. |
| 7,404,013 B1 | 7/2008 | Masiewicz |
| 7,406,545 B1 | 7/2008 | Rothberg et al. |
| 7,415,571 B1 | 8/2008 | Hanan |
| 7,436,610 B1 | 10/2008 | Thelin |
| 7,437,502 B1 | 10/2008 | Coker |
| 7,440,214 B1 | 10/2008 | Ell et al. |
| 7,451,344 B1 | 11/2008 | Rothberg |
| 7,453,661 B1 | 11/2008 | Jang et al. |
| 7,471,483 B1 | 12/2008 | Ferris et al. |
| 7,471,486 B1 | 12/2008 | Coker et al. |
| 7,486,060 B1 | 2/2009 | Bennett |
| 7,486,460 B2 * | 2/2009 | Tsuchinaga ............ G11B 5/012 360/48 |
| 7,496,493 B1 | 2/2009 | Stevens |
| 7,518,819 B1 | 4/2009 | Yu et al. |
| 7,526,184 B1 | 4/2009 | Parkinen et al. |
| 7,539,924 B1 | 5/2009 | Vasquez et al. |
| 7,543,117 B1 | 6/2009 | Hanan |
| 7,551,383 B1 | 6/2009 | Kupferman |
| 7,562,282 B1 | 7/2009 | Rothberg |
| 7,577,973 B1 | 8/2009 | Kapner, III et al. |
| 7,596,797 B1 | 9/2009 | Kapner, III et al. |
| 7,599,139 B1 | 10/2009 | Bombet et al. |
| 7,619,841 B1 | 11/2009 | Kupferman |
| 7,647,544 B1 | 1/2010 | Masiewicz |
| 7,649,704 B1 | 1/2010 | Bombet et al. |
| 7,653,927 B1 | 1/2010 | Kapner, III et al. |
| 7,656,603 B1 | 2/2010 | Xing |
| 7,656,763 B1 | 2/2010 | Jin et al. |
| 7,657,149 B2 | 2/2010 | Boyle |
| 7,672,072 B1 | 3/2010 | Boyle et al. |
| 7,673,075 B1 | 3/2010 | Masiewicz |
| 7,688,540 B1 | 3/2010 | Mei et al. |
| 7,724,461 B1 | 5/2010 | McFadyen et al. |
| 7,725,584 B1 | 5/2010 | Hanmann et al. |
| 7,730,295 B1 | 6/2010 | Lee |
| 7,760,458 B1 | 7/2010 | Trinh |
| 7,768,776 B1 | 8/2010 | Szeremeta et al. |
| 7,804,657 B1 | 9/2010 | Hogg et al. |
| 7,813,954 B1 | 10/2010 | Price et al. |
| 7,827,320 B1 | 11/2010 | Stevens |
| 7,839,588 B1 | 11/2010 | Dang et al. |
| 7,843,660 B1 | 11/2010 | Yeo |
| 7,852,596 B2 | 12/2010 | Boyle et al. |
| 7,859,782 B1 | 12/2010 | Lee |
| 7,872,822 B1 | 1/2011 | Rothberg |
| 7,898,756 B1 | 3/2011 | Wang |
| 7,898,762 B1 | 3/2011 | Guo et al. |
| 7,900,037 B1 | 3/2011 | Fallone et al. |
| 7,907,364 B2 | 3/2011 | Boyle et al. |
| 7,929,234 B1 | 4/2011 | Boyle et al. |
| 7,933,087 B1 | 4/2011 | Tsai et al. |
| 7,933,090 B1 | 4/2011 | Jung et al. |
| 7,934,030 B1 | 4/2011 | Sargenti, Jr. et al. |
| 7,940,491 B2 | 5/2011 | Szeremeta et al. |
| 7,944,639 B1 | 5/2011 | Wang |
| 7,945,727 B2 | 5/2011 | Rothberg et al. |
| 7,949,564 B1 | 5/2011 | Hughes et al. |
| 7,974,029 B2 | 7/2011 | Tsai et al. |
| 7,974,039 B1 | 7/2011 | Xu et al. |
| 7,982,993 B1 | 7/2011 | Tsai et al. |
| 7,984,200 B1 | 7/2011 | Bombet et al. |
| 7,990,648 B1 | 8/2011 | Wang |
| 7,992,179 B1 | 8/2011 | Kapner, III et al. |
| 8,004,785 B1 | 8/2011 | Tsai et al. |
| 8,006,027 B1 | 8/2011 | Stevens et al. |
| 8,014,094 B1 | 9/2011 | Jin |
| 8,014,977 B1 | 9/2011 | Masiewicz et al. |
| 8,019,914 B1 | 9/2011 | Vasquez et al. |
| 8,040,625 B1 | 10/2011 | Boyle et al. |
| 8,078,943 B1 | 12/2011 | Lee |
| 8,079,045 B2 | 12/2011 | Krapf et al. |
| 8,082,433 B1 | 12/2011 | Fallone et al. |
| 8,085,487 B1 | 12/2011 | Jung et al. |
| 8,089,719 B1 | 1/2012 | Dakroub |
| 8,090,902 B1 | 1/2012 | Bennett et al. |
| 8,090,906 B1 | 1/2012 | Blaha et al. |
| 8,091,112 B1 | 1/2012 | Elliott et al. |
| 8,094,396 B1 | 1/2012 | Zhang et al. |
| 8,094,401 B1 | 1/2012 | Peng et al. |
| 8,116,020 B1 | 2/2012 | Lee |
| 8,116,025 B1 | 2/2012 | Chan et al. |
| 8,134,793 B1 | 3/2012 | Vasquez et al. |
| 8,134,798 B1 | 3/2012 | Thelin et al. |
| 8,139,301 B1 | 3/2012 | Li et al. |
| 8,139,310 B1 | 3/2012 | Hogg |
| 8,144,419 B1 | 3/2012 | Liu |
| 8,145,452 B1 | 3/2012 | Masiewicz et al. |
| 8,149,528 B1 | 4/2012 | Suratman et al. |
| 8,154,812 B1 | 4/2012 | Boyle et al. |
| 8,159,768 B1 | 4/2012 | Miyamura |
| 8,161,328 B1 | 4/2012 | Wilshire |
| 8,164,849 B1 | 4/2012 | Szeremeta et al. |
| 8,174,780 B1 | 5/2012 | Tsai et al. |
| 8,190,575 B1 | 5/2012 | Ong et al. |
| 8,194,338 B1 | 6/2012 | Zhang |
| 8,194,340 B1 | 6/2012 | Boyle et al. |
| 8,194,341 B1 | 6/2012 | Boyle |

(56) References Cited

U.S. PATENT DOCUMENTS

| | | |
|---|---|---|
| 8,201,066 B1 | 6/2012 | Wang |
| 8,271,692 B1 | 9/2012 | Dinh et al. |
| 8,279,550 B1 | 10/2012 | Hogg |
| 8,281,218 B1 | 10/2012 | Ybarra et al. |
| 8,285,923 B2 | 10/2012 | Stevens |
| 8,289,656 B1 | 10/2012 | Huber |
| 8,305,705 B1 | 11/2012 | Roohr |
| 8,307,156 B1 | 11/2012 | Codilian et al. |
| 8,310,775 B1 | 11/2012 | Boguslawski et al. |
| 8,315,006 B1 | 11/2012 | Chahwan et al. |
| 8,316,263 B1 | 11/2012 | Gough et al. |
| 8,320,067 B1 | 11/2012 | Tsai et al. |
| 8,324,974 B1 | 12/2012 | Bennett |
| 8,332,695 B2 | 12/2012 | Dalphy et al. |
| 8,339,919 B1 | 12/2012 | Lee |
| 8,341,337 B1 | 12/2012 | Ong et al. |
| 8,350,628 B1 | 1/2013 | Bennett |
| 8,356,184 B1 | 1/2013 | Meyer et al. |
| 8,370,683 B1 | 2/2013 | Ryan et al. |
| 8,375,225 B1 | 2/2013 | Ybarra |
| 8,375,274 B1 | 2/2013 | Bonke |
| 8,380,922 B1 | 2/2013 | DeForest et al. |
| 8,390,948 B2 | 3/2013 | Hogg |
| 8,390,952 B1 | 3/2013 | Szeremeta |
| 8,392,689 B1 | 3/2013 | Lott |
| 8,407,393 B1 | 3/2013 | Yolar et al. |
| 8,413,010 B1 | 4/2013 | Vasquez et al. |
| 8,417,566 B2 | 4/2013 | Price et al. |
| 8,421,663 B1 | 4/2013 | Bennett |
| 8,422,172 B1 | 4/2013 | Dakroub et al. |
| 8,427,770 B1 | 4/2013 | O'Dell et al. |
| 8,427,771 B1 | 4/2013 | Tsai |
| 8,429,343 B1 | 4/2013 | Tsai |
| 8,433,937 B1 | 4/2013 | Wheelock et al. |
| 8,433,977 B1 | 4/2013 | Vasquez et al. |
| 8,441,909 B1 | 5/2013 | Thayamballi et al. |
| 8,456,980 B1 | 6/2013 | Thayamballi |
| 8,458,526 B2 | 6/2013 | Dalphy et al. |
| 8,462,466 B2 | 6/2013 | Huber |
| 8,462,468 B2 * | 6/2013 | Katada .................. G11B 5/3912 360/125.3 |
| 8,467,151 B1 | 6/2013 | Huber |
| 8,483,027 B1 | 7/2013 | Mak et al. |
| 8,489,841 B1 | 7/2013 | Strecke et al. |
| 8,493,679 B1 | 7/2013 | Boguslawski et al. |
| 8,499,198 B1 | 7/2013 | Messenger et al. |
| 8,514,506 B1 | 8/2013 | Li et al. |
| 8,554,741 B1 | 10/2013 | Malina |
| 8,560,759 B1 | 10/2013 | Boyle et al. |
| 8,576,509 B1 | 11/2013 | Hogg |
| 8,576,511 B1 | 11/2013 | Coker et al. |
| 8,578,100 B1 | 11/2013 | Huynh et al. |
| 8,578,242 B1 | 11/2013 | Burton et al. |
| 8,582,223 B1 | 11/2013 | Garani et al. |
| 8,582,231 B1 | 11/2013 | Kermiche et al. |
| 8,589,773 B1 | 11/2013 | Wang et al. |
| 8,593,753 B1 | 11/2013 | Anderson |
| 8,599,512 B2 | 12/2013 | Hogg |
| 8,605,379 B1 | 12/2013 | Sun |
| 8,611,031 B1 | 12/2013 | Tan et al. |
| 8,611,032 B2 | 12/2013 | Champion et al. |
| 8,612,798 B1 | 12/2013 | Tsai |
| 8,619,383 B1 | 12/2013 | Jung et al. |
| 8,619,508 B1 | 12/2013 | Krichevsky et al. |
| 8,619,529 B1 | 12/2013 | Liew et al. |
| 8,621,115 B1 | 12/2013 | Bombet et al. |
| 8,621,133 B1 | 12/2013 | Boyle |
| 8,625,224 B1 | 1/2014 | Lin et al. |
| 8,625,225 B1 | 1/2014 | Wang |
| 8,626,463 B2 | 1/2014 | Stevens et al. |
| 8,630,052 B1 | 1/2014 | Jung et al. |
| 8,631,188 B1 | 1/2014 | Heath et al. |
| 8,635,412 B1 | 1/2014 | Wilshire |
| 8,661,193 B1 | 2/2014 | Cobos et al. |
| 8,665,547 B1 | 3/2014 | Yeo et al. |
| 8,667,248 B1 | 3/2014 | Neppalli |
| 8,670,205 B1 | 3/2014 | Malina et al. |
| 8,671,250 B2 | 3/2014 | Lee |
| 8,681,442 B2 | 3/2014 | Hogg |
| 8,681,445 B1 | 3/2014 | Kermiche et al. |
| 8,683,295 B1 | 3/2014 | Syu et al. |
| 8,687,306 B1 | 4/2014 | Coker et al. |
| 8,687,307 B1 | 4/2014 | Patton, III |
| 8,687,313 B2 | 4/2014 | Selvaraj |
| 8,693,133 B1 | 4/2014 | Lee et al. |
| 8,698,492 B1 | 4/2014 | Mak et al. |
| 8,699,171 B1 | 4/2014 | Boyle |
| 8,699,172 B1 | 4/2014 | Gunderson et al. |
| 8,711,500 B1 | 4/2014 | Fong et al. |
| 8,711,506 B1 | 4/2014 | Giovenzana et al. |
| 8,711,665 B1 | 4/2014 | Abdul Hamid |
| 8,717,694 B1 | 5/2014 | Liew et al. |
| 8,717,695 B1 | 5/2014 | Lin et al. |
| 8,730,612 B1 | 5/2014 | Haralson |
| 8,743,502 B1 | 6/2014 | Bonke et al. |
| 8,749,911 B1 | 6/2014 | Sun et al. |
| 8,753,146 B1 | 6/2014 | Szeremeta et al. |
| 8,755,136 B1 | 6/2014 | Ng et al. |
| 8,756,361 B1 | 6/2014 | Carlson et al. |
| 8,760,782 B1 | 6/2014 | Garani et al. |
| 8,760,792 B1 | 6/2014 | Tam |
| 8,769,593 B1 | 7/2014 | Schwartz et al. |
| 8,773,793 B1 | 7/2014 | McFadyen |
| 8,773,802 B1 | 7/2014 | Anderson et al. |
| 8,773,807 B1 | 7/2014 | Chia et al. |
| 8,773,957 B1 | 7/2014 | Champion et al. |
| 8,780,470 B1 | 7/2014 | Wang et al. |
| 8,782,334 B1 | 7/2014 | Boyle et al. |
| 8,786,976 B1 | 7/2014 | Kang et al. |
| 8,787,125 B1 | 7/2014 | Lee |
| 8,792,196 B1 | 7/2014 | Lee |
| 8,792,200 B1 | 7/2014 | Tam et al. |
| 8,797,667 B1 | 8/2014 | Barlow et al. |
| 8,799,977 B1 | 8/2014 | Kapner, III et al. |
| 8,817,413 B1 | 8/2014 | Knigge et al. |
| 8,817,584 B1 | 8/2014 | Selvaraj |
| 8,825,976 B1 | 9/2014 | Jones |
| 8,825,977 B1 | 9/2014 | Syu et al. |
| 2009/0113702 A1 | 5/2009 | Hogg |
| 2010/0306551 A1 | 12/2010 | Meyer et al. |
| 2011/0226729 A1 | 9/2011 | Hogg |
| 2012/0159042 A1 | 6/2012 | Lott et al. |
| 2012/0275050 A1 | 11/2012 | Wilson et al. |
| 2012/0281963 A1 | 11/2012 | Krapf et al. |
| 2012/0324980 A1 | 12/2012 | Nguyen et al. |

\* cited by examiner

DATA STORAGE DEVICE EMPLOYING MIRRORED CROSS-TRACK PROFILES FOR TOP AND BOTTOM DISK SURFACES

BACKGROUND

Data storage devices such as disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the actuator arm as it seeks from track to track.

Figure 1:
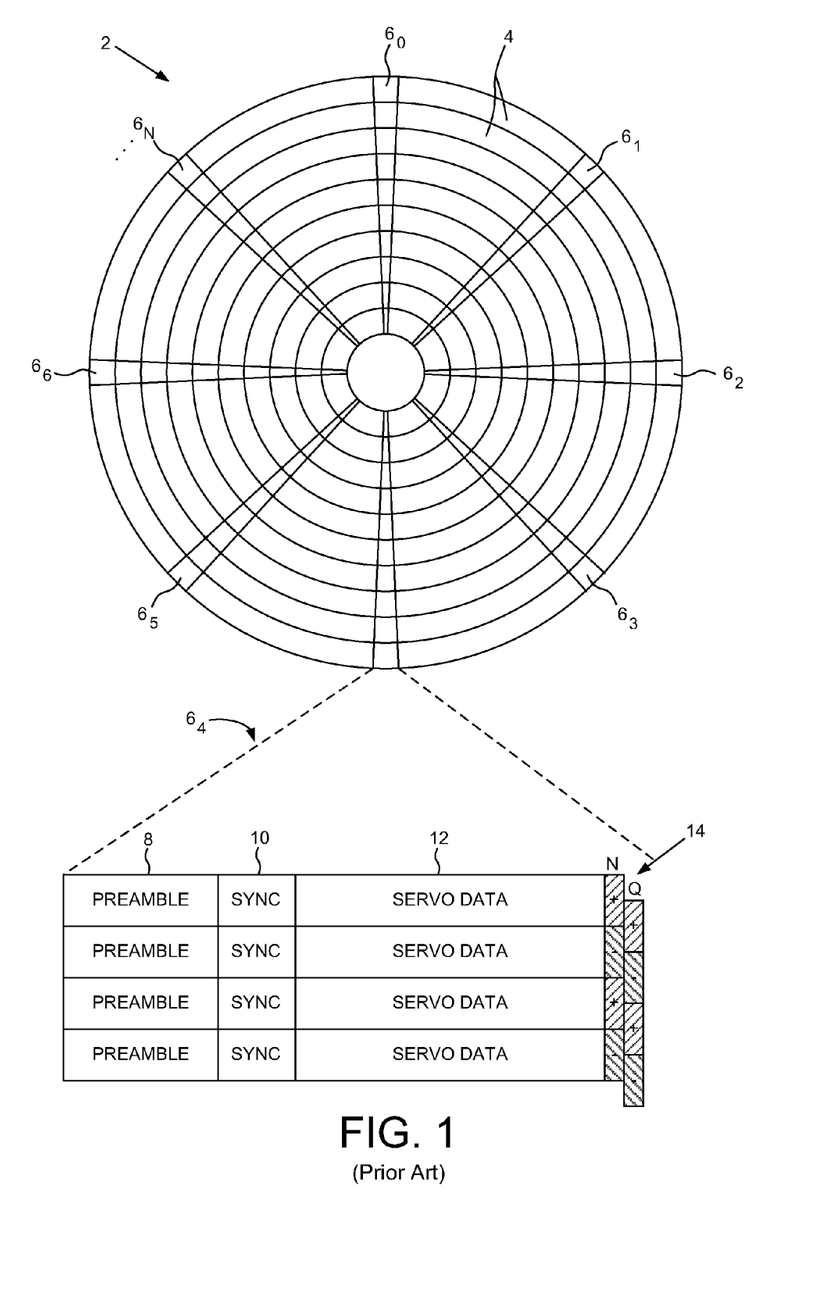
FIG. 1 shows a prior art disk format comprising a plurality of tracks defined by servo sectors.

FIG. 1 shows a prior art disk format 2 as comprising a number of servo tracks 4 defined by servo sectors $6_0$-$6_N$ recorded around the circumference of each servo track. Each servo sector $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo sector $6_i$ further comprises groups of servo bursts 14 (e.g., N and Q servo bursts), which are recorded with a predetermined phase relative to one another and relative to the servo track centerlines. The phase based servo bursts 14 provide fine head position information used for centerline tracking while accessing a data track during write/read operations. A position error signal (PES) is generated by reading the servo bursts 14, wherein the PES represents a measured position of the head relative to a centerline of a target servo track. A servo controller processes the PES to generate a control signal applied to a head actuator (e.g., a voice coil motor) in order to actuate the head radially over the disk in a direction that reduces the PES.

DETAILED DESCRIPTION

Figure 2A:
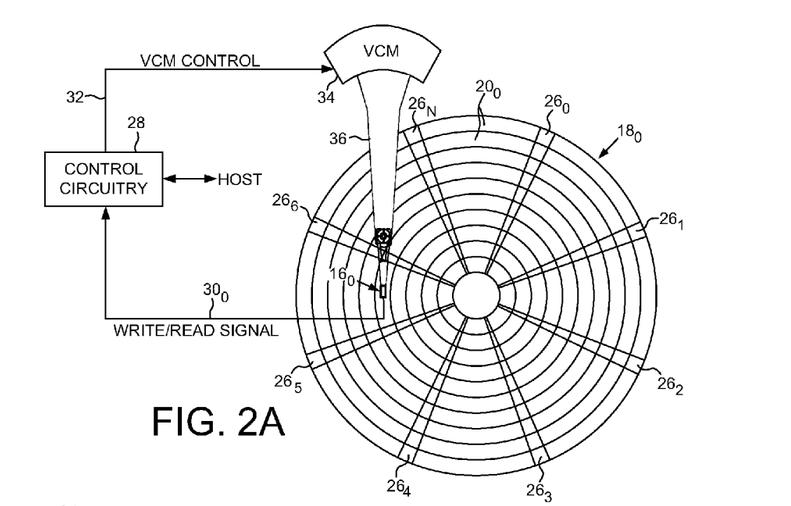
FIGS. 2A and 2B show a data storage device in the form of a disk drive according to an embodiment comprising a first head actuated over a top disk surface and a second head actuated over a bottom disk surface.
Figure 2B:
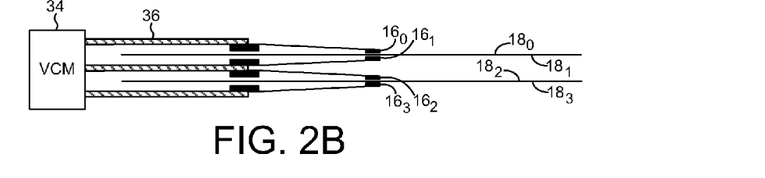
Figure 2C:
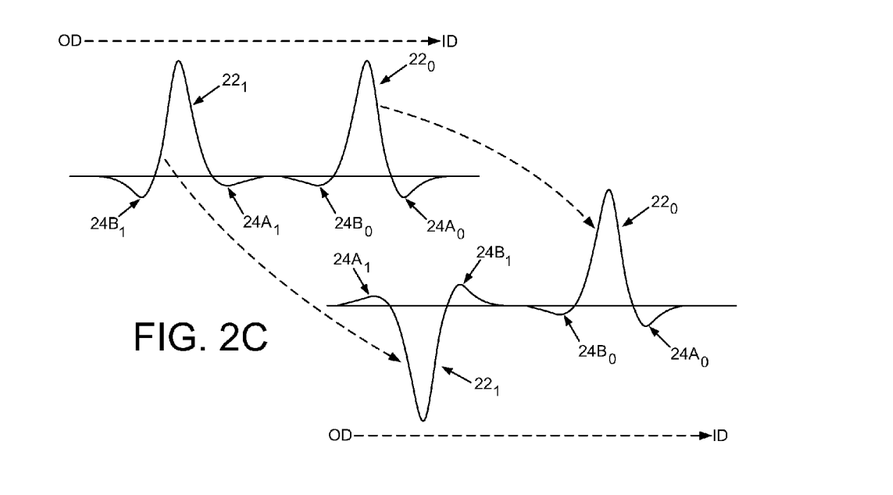
FIG. 2C shows an embodiment wherein when the first head is over the top disk surface, a first undershoot of a first cross-track profile is closer to an inner diameter (ID) of the disk and a second undershoot of the first cross-track profile is closer to an outer diameter (OD) of the disk, and when a second head is over the bottom disk surface, a second undershoot of a second cross-track profile is closer to the OD of the disk and a first undershoot of the second cross-track profile is closer to the ID of the disk.

FIGS. 2A and 2B shows a data storage device in the form of a disk drive according to an embodiment comprising a disk comprising a top disk surface $18_0$ comprising a plurality of data tracks $20_0$ and a bottom disk surface $18_1$ comprising a plurality of data tracks. A first head $16_0$ is actuated over the top disk surface $18_0$, wherein as shown in FIG. 2C the first head $16_0$ exhibits a first cross-track profile $22_0$ when reading a reference track on a reference disk surface. The first cross-track profile $22_0$ comprises a first undershoot $24A_0$ near a first edge of the reference track and a second undershoot $24B_0$ near a second edge of the reference track. A second head $16_1$ is actuated over the bottom disk surface $18_1$, wherein as shown in FIG. 2C the second head $16_1$ exhibits a second cross-track profile $22_1$ when reading the reference track on the reference disk surface. The second cross-track profile $22_1$ comprises a first undershoot $24A_1$ near the first edge of the reference track and a second undershoot $24B_1$ near the second edge of the reference track. Referring again to FIG. 2C, when the first head $16_0$ is over the top disk surface $18_0$, the first undershoot $24A_0$ of the first cross-track profile $22_0$ is closer to an inner diameter of the disk and the second undershoot $24B_0$ of the first cross-track profile $22_0$ is closer to an outer diameter of the disk. When the second head $16_1$ is over the bottom disk surface $18_1$, the second undershoot $24B_1$ of the second cross-track profile $22_1$ is closer to the inner diameter of the disk and the first undershoot $24A_1$ of the second cross-track profile $22_1$ is closer to the outer diameter of the disk.

In the embodiment of FIG. 2A, at least one disk surface (e.g., top disk surface $18_0$) comprises a plurality of servo sectors $26_0$-$26_N$ that define a plurality of servo tracks, wherein the data tracks 20 are defined relative to the servo tracks at the same or different radial density. Control circuitry 28 processes a read signal $30_0$ emanating from the head (e.g., first head $16_0$) to demodulate the servo sectors $26_0$-$26_N$ and generate a position error signal (PES) representing an error between the actual position of the head and a target position relative to a target track. A servo control system in the control circuitry 28 filters the PES using a suitable compensation filter to generate a control signal 32 applied to a voice coil motor (VCM) 34 which rotates an actuator arm 36 about a pivot in order to actuate the head radially over the disk surface in a direction that reduces the PES. The servo sectors $26_0$-$26_N$ may comprise any suitable head position information, such as a track address for coarse positioning and servo bursts for fine positioning. The servo bursts may comprise any suitable pattern, such as an amplitude based servo pattern or a phase based servo pattern (FIG. 1).

Figure 4:
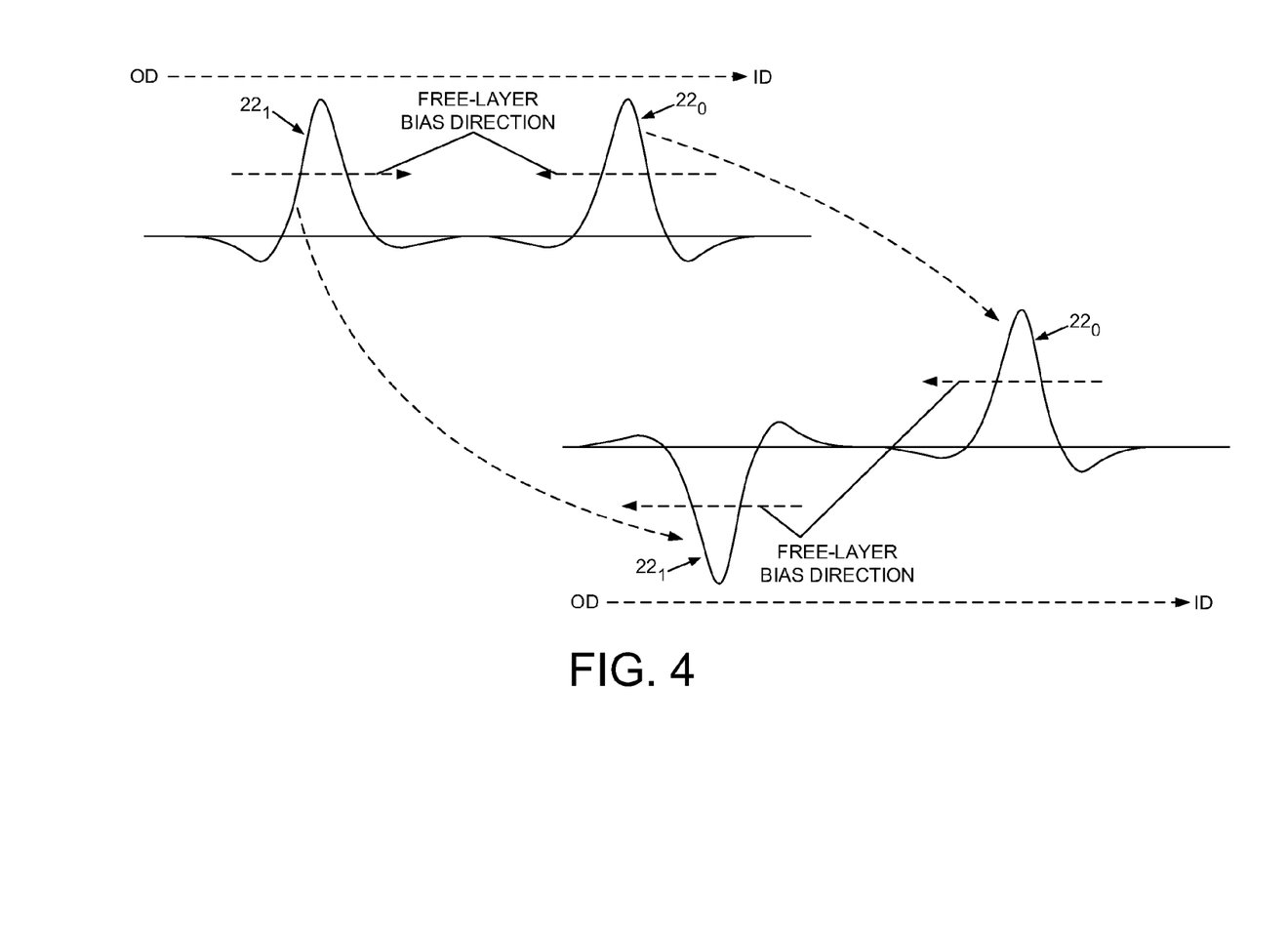
FIG. 4 shows an embodiment wherein when the first head is over the top disk surface, a first free-layer bias direction of the first head points toward the OD of the disk, and when the second head is over the bottom disk surface, a second free-layer bias direction of the second head points toward the OD of the disk.

The cross-track profiles $22_0$ and $22_1$ shown in FIG. 2C may be generated in any suitable manner. In one embodiment, a cross-track profile may be generated by writing a periodic pattern to a reference track using a write element, and then scanning a read element over the width of the reference track while measuring the amplitude of the resulting read signal. As shown in FIG. 2C, the amplitude of the read signal reaches a maximum when the read element nears a center of the reference track and decreases toward the edges of the reference track. For certain types of read elements, the amplitude of the read signal may flip polarity near each edge of the reference track resulting in negative amplitude undershoots (e.g., $24A_0$ and $24B_0$) as shown in FIG. 2C. In one embodiment, depending on the configuration of the read element, the amplitudes of the undershoots may be asymmetric in that one of the undershoots may exhibit a larger amplitude than the other undershoot. In an embodiment described below with reference to FIG. 4, the asymmetry of the undershoots may be caused by a free-layer bias direction of the read element. For example, if the free-layer bias direction points from the ID side of the reference track toward the OD side of the reference track, the resulting cross-track profile $22_0$ will exhibit a larger amplitude undershoot near the ID side of the reference track as shown in FIG. 4. In an embodiment described below, the read element of each head may be fabricated so that the asymmetric undershoots in the cross-track profiles for the top and bottom heads of a disk are mirrored so that the larger amplitude undershoot occurs toward the ID of both disk surfaces. In this manner the larger amplitude undershoot may, in one embodiment, be advantageously used to attenuate intertrack interference (ITI) from adjacent data tracks when reading a target data track. In one embodiment, the ITI attenuating effect of the undershoot in the cross-track profile may be particularly useful when at least some of the data tracks of a disk surface are shingle written.

Figure 3A:
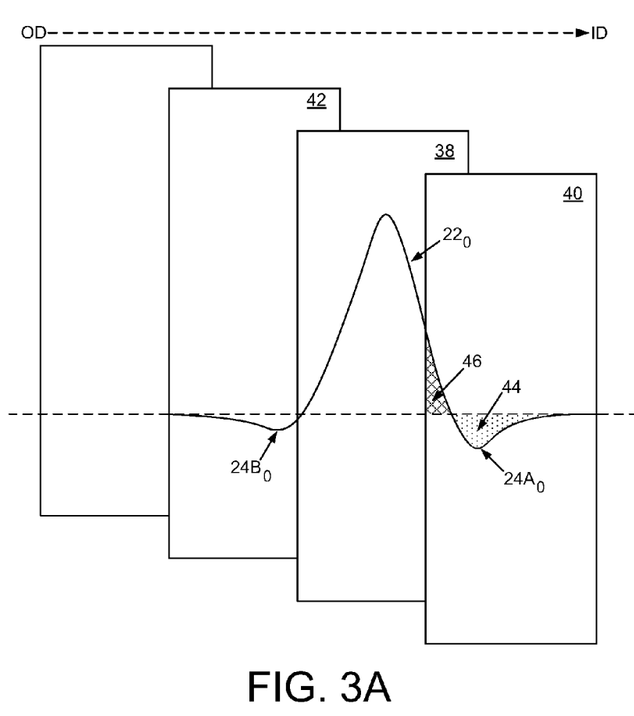
FIG. 3A shows an embodiment wherein when a number of the data tracks of the top disk surface are shingle written from the OD of the disk toward the ID of the disk, the first undershoot of the first cross-track profile reduces intertrack interference from the shingled data track (toward the ID).

FIG. 3A shows an embodiment wherein a number of data tracks on the first disk surface $18_0$ are shingle written from an OD toward the ID of the disk surface. When shingle writing the data tracks, a previously written data track is partially overwritten by a currently written data track. For example, in FIG. 3A data track 38 is partially overwritten by shingled data track 40 which means when reading data track 38 there is more ITI from the shingled data track 40 (toward the ID) than from the overwritten data track 42 (toward the OD). In one embodiment, the undershoot $24A_0$ in the cross-track profile $22_0$ helps attenuate the ITI from the shingled data track 40 since the area 44 defined by the undershoot $24A_0$ is negative amplitude and therefore effectively cancels the area 46 in the cross-track profile $22_0$ which is positive amplitude. Accordingly, in one embodiment the read element of each head is fabricated so that the larger undershoot of the cross-track profile occurs toward the shingled data track, thereby attenuating the more significant ITI that is caused by the shingled data track.

Figure 3B:
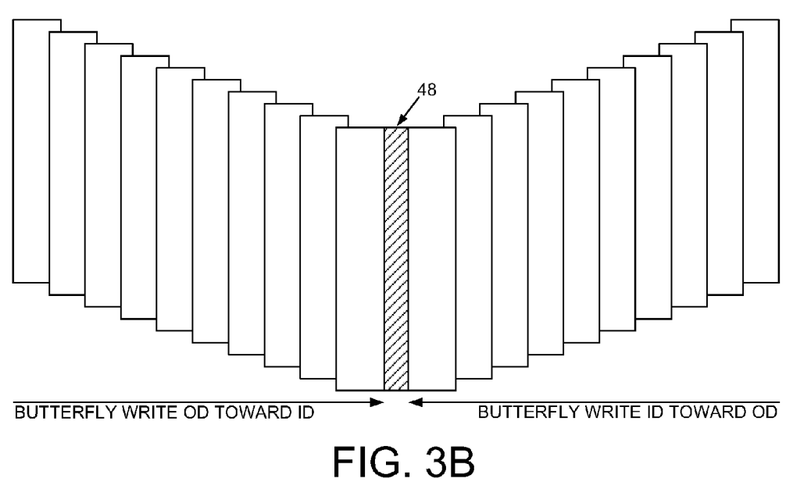
FIG. 3B shows an embodiment wherein the data tracks of a disk surface are shingle written in a butterfly pattern from the OD toward a middle diameter (MD) of the disk, and from the ID toward the MD of the disk.

In one embodiment, the data tracks are shingle written in a butterfly pattern as shown in FIG. 3B meaning that the data tracks are written from the OD toward the MD of the disk and from the ID toward the MD, where the radial location 48 at the center of the butterfly pattern is referred to as the pivot point. In one embodiment, the read element of each head is fabricated so that the ITI attenuating effect of the larger undershoot in the cross-track profile occurs in the OD part of the butterfly pattern where there is more capacity due to the larger circumference of each data track. That is, the ITI attenuating affect described above with reference to FIG. 3A occurs at the OD part of the butterfly pattern since the larger undershoot $24A_0$ occurs toward the shingled data tracks (toward the ID). In order to realize the ITI attenuating effect of the larger undershoot for both top and bottom disk surfaces, in one embodiment the read elements of the respective heads are fabricated so that the cross-track profiles are mirrored as shown in FIG. 2C. In this manner, the larger undershoot $24A_0$ of the top disk surface occurs toward the ID of the disk surface and the larger undershoot $24B_1$ of the bottom disk surface also occurs toward the ID of the disk surface.

In one embodiment, the data tracks are shingle written in a butterfly pattern as shown in FIG. 3B due to the skew angle of the write element in each head. That is, if the data tracks were shingle written across the entire radius of a disk surface from the OD to the ID, at some point the skew angle of the write element will cause an undesirable overwriting of the previously written tracks which further increases the ITI when attempting to read the overwritten tracks. Accordingly in one embodiment, the pivot point 48 of the butterfly pattern shown in FIG. 3B may be selected so as to optimize the capacity of the data tracks. That is, for a given radial density of the data tracks (tracks per inch (TPI)) there may be an optimal pivot point which maximizes the benefit of the ITI attenuating effect of the cross-track profile for the OD data tracks, but also takes into account the ITI caused by the increasing skew angle of the write element toward the ID data tracks. At a certain radial location the ITI due to the skew angle of the write element will exceed the ITI attenuating effect of the cross-track profile, and therefore this radial location may be selected as the pivot point 48 of the butterfly pattern shown in FIG. 3B.

The asymmetric cross-track profile such as shown in FIG. 2C, and particularly the large undershoot on one side of the reference track may be the result of a fabrication characteristic of the read elements. FIG. 4 shows an embodiment wherein the asymmetric undershoots in the cross-track profile may be due to a bias direction of a free-layer of a magnetoresistive read element. In the example of FIG. 4, the top head has a free-layer bias direction that points from the ID toward the OD, thereby causing the larger undershoot in the cross-track profile $22_0$ to occur toward the ID. The bottom head has a free-layer bias direction that points in the opposite direction (from the OD toward the ID), thereby causing the larger undershoot in the cross-track profile $22_1$ to occur toward the OD. When the bottom head is installed into the disk drive and positioned over the bottom surface, the cross-track profile $22_1$ is flipped horizontally and vertically as shown in FIG. 4 such that the larger undershoot occurs toward the ID of the bottom disk surface. In this manner, the larger undershoot in the cross-track profile of both the top head and bottom head occur toward the ID of the respective disk surfaces, thereby providing the ITI attenuating effect for the OD data tracks of both disk surfaces as described above.

In one embodiment, the free-layer bias direction of a magnetoresistive read element may be configured by applying a strong magnetic field to the read element during or after fabricating the read element. In some embodiments, certain types of magnetoresistive read elements may require an elevated temperature when applying the magnetic field to configure the free-layer bias direction, and in other embodiments the magnetic field may be applied at room temperature. In some embodiments, the free-layer bias direction may be configured by applying the magnetic field at the wafer level, bar level, or slider level, and in other embodiments the magnetic field may be applied after coupling the slider to a head gimbal assembly (HGA), after assembling the head stack assembly (HSA), or even after installing the HSA into a disk drive.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

What is claimed is:

1. A data storage device comprising:
   a disk comprising a top disk surface comprising a plurality of data tracks and a bottom disk surface comprising a plurality of data tracks;
   a first head actuated over the top disk surface, wherein the first head exhibits a first cross-track profile when reading a reference track on a reference disk surface, the first cross-track profile comprising a first undershoot near a first edge of the reference track and a second undershoot near a second edge of the reference track; and
   a second head actuated over the bottom disk surface, wherein the second head exhibits a second cross-track profile when reading the reference track on the reference disk surface, the second cross-track profile comprising a first undershoot near the first edge of the reference track and a second undershoot near the second edge of the reference track;
   wherein:
      the first and second cross-track profiles are generated by scanning the first head and the second head over a width of the reference track while measuring an amplitude of a resulting read signal;
      when the first head is over the top disk surface, the first undershoot of the first cross-track profile is closer to an inner diameter of the disk and the second undershoot of the first cross-track profile is closer to an outer diameter of the disk;
      when the second head is over the bottom disk surface, the second undershoot of the second cross-track profile is closer to the inner diameter of the disk and the first undershoot of the second cross-track profile is closer to the outer diameter of the disk;
      the first undershoot of the first cross-track profile comprises an amplitude greater than an amplitude of the second undershoot of the first cross-track profile; and
      the second undershoot of the second cross-track profile comprises an amplitude greater than an amplitude of the first undershoot of the second cross-track profile.

2. The data storage device as recited in claim 1, wherein:
   when the data tracks of the top disk surface are shingle written from an outer diameter of the disk toward an inner diameter of the disk, the first undershoot of the first cross-track profile reduces intertrack interference from the inner diameter track; and
   when the data tracks of the bottom disk surface are shingle written from the outer diameter of the disk toward inner diameter of the disk, the second undershoot of the second cross-track profile reduces intertrack interference from the inner diameter track.

3. The data storage device as recited in claim 1, wherein:
   the first head comprises a first read element comprising a first free-layer bias direction; and
   the second head comprises a second read element comprising a second free-layer bias direction opposite the first free-layer bias direction.

4. The data storage device as recited in claim 3, wherein:
   when the first head is over the top disk surface, the first free-layer bias direction points toward the outer diameter of the disk; and
   when the second head is over the bottom disk surface, the second free-layer bias direction points toward the outer diameter of the disk.

5. A method of operating a data storage device, the method comprising:
   actuating a first head over a top disk surface of a disk, wherein the first head exhibits a first cross-track profile when reading a reference track on a reference disk surface, the first cross-track profile comprising a first undershoot near a first edge of the reference track and a second undershoot near a second edge of the reference track; and
   actuating a second head over a bottom disk surface of the disk, wherein the second head exhibits a second cross-track profile when reading the reference track on the reference disk surface, the second cross-track profile comprising a first undershoot near the first edge of the reference track and a second undershoot near the second edge of the reference track;
   wherein:
      the first and second cross-track profiles are generated by scanning the first head and the second head over a width of the reference track while measuring an amplitude of a resulting read signal;
      when the first head is over the top disk surface, the first undershoot of the first cross-track profile is closer to an inner diameter of the disk and the second undershoot of the first cross-track profile is closer to an outer diameter of the disk;
      when the second head is over the bottom disk surface, the second undershoot of the second cross-track profile is closer to the inner diameter of the disk and the first undershoot of the second cross-track profile is closer to the outer diameter of the disk;
      the first undershoot of the first cross-track profile comprises an amplitude greater than an amplitude of the second undershoot of the first cross-track profile; and
      the second undershoot of the second cross-track profile comprises an amplitude greater than an amplitude of the first undershoot of the second cross-track profile.

6. The method as recited in claim 5, wherein:
   when the data tracks of the top disk surface are shingle written from an outer diameter of the disk toward an inner diameter of the disk, the first undershoot of the first cross-track profile reduces intertrack interference from the inner diameter track; and
   when the data tracks of the bottom disk surface are shingle written from the outer diameter of the disk toward inner diameter of the disk, the second undershoot of the second cross-track profile reduces intertrack interference from the inner diameter track.

7. The method as recited in claim 6, wherein:
   the first head comprises a first read element comprising a first free-layer bias direction; and the second head comprises a second read element comprising a second free-layer bias direction opposite the first free-layer bias direction.

8. The method as recited in claim 7, wherein:

when the first head is over the top disk surface, the first free-layer bias direction points toward the outer diameter of the disk; and when the second head is over the bottom disk surface, the second free-layer bias direction points toward the outer diameter of the disk.

* * * * *